INVENTORS.
George H. Beall
Hermann L. Rittler

United States Patent Office 3,723,140
Patented Mar. 27, 1973

3,723,140
GLASS-CERAMICS CONTAINING POLLUCITE
George H. Beall, Big Flats, and Hermann L. Rittler, Horseheads, N.Y., assignors to Corning Glass Works, Corning, N.Y.
Filed Dec. 28, 1971, Ser. No. 212,952
Int. Cl. C03c 3/22
U.S. Cl. 106—39.6                    2 Claims

ABSTRACT OF THE DISCLOSURE

The instant invention relates to the production of opaque glass-ceramic articles having compositions within the $Cs_2O$-$Al_2O_3$-$SiO_2$ field wherein the crystal phase present consists essentially of pollucite solid solution with, frequently, a minor amount of mullite. The articles exhibit extreme refractoriness, e.g., certain bodies demonstrate excellent dimensional stability to temperatures up to 1550° C. This high refractoriness, coupled with chemical inertness to molten metal, has led to the use of these materials as preform cores in the making of hollow metal castings, such as jet engine blades and vanes which require the use of very high temperature alloys such as the so-called super alloys of nickel and cobalt base.

---

Figure 1:
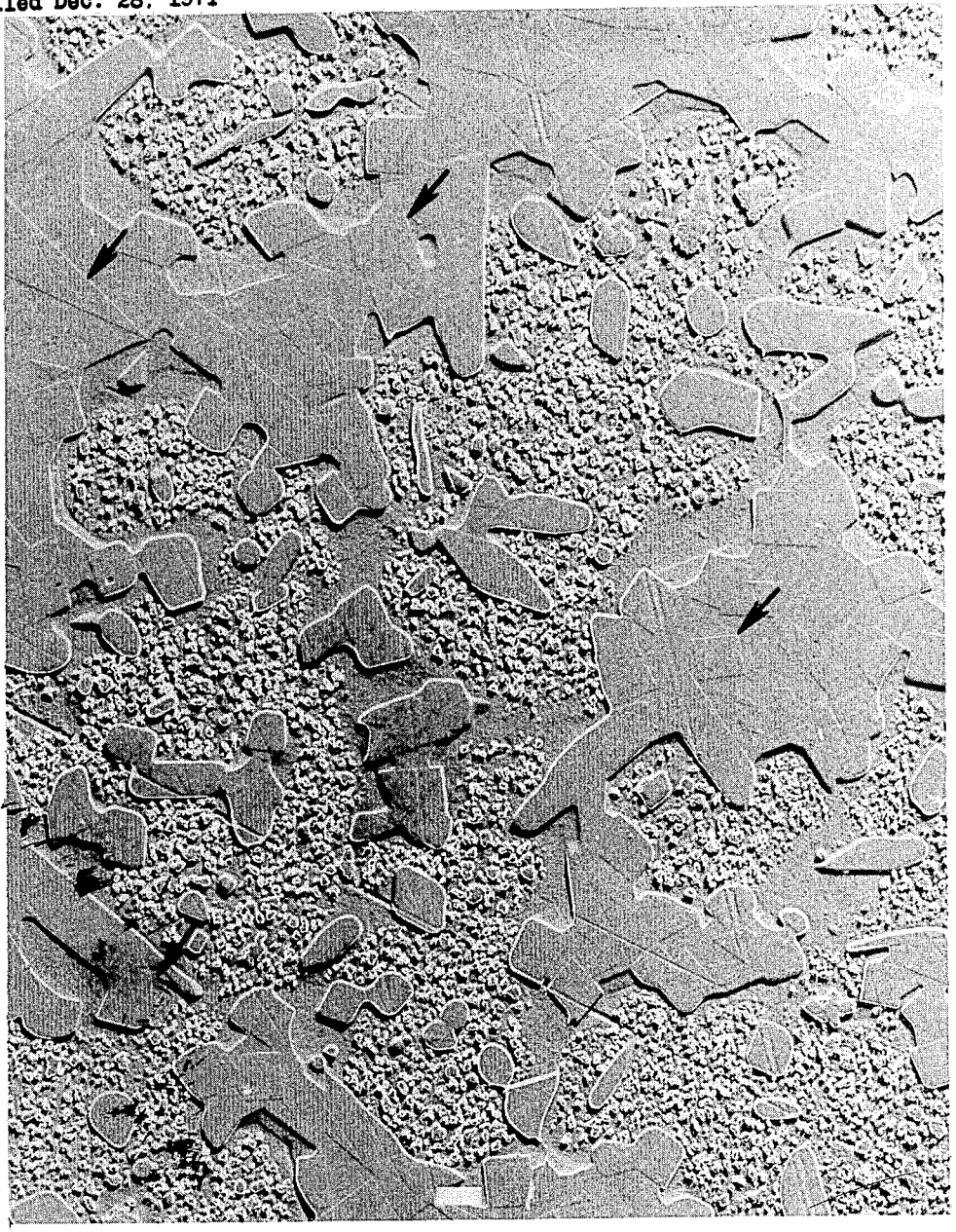

The formation of glass-ceramic articles involves the crystallization in situ of glass articles. Thus, a glass-forming batch to which a nucleating agent is commonly admixed is melted, this melt simultaneously cooled to a glass and an article of a desired configuration shaped therefrom, and the resultant glass article thereafter exposed to a heat treatment designed to first cause the development of nuclei in the glass which act as sites for the growth of crystals thereon as the heat treatment is continued.

Since this crystallization is the result of an essentially simultaneous growth of crystals upon innumerable submicroscopic nuclei, the glass-ceramic article consists of relatively uniformly fine-grained crystals essentially homogeneously dispersed in a residual glassy matrix, the crystal phase constituting the predominaant proportion of the article. In the main, glass-ceramic articles have been defined as being at least 50% by weight or volume crystalline and, normally, are actually greater than 75% by weight or volume crystalline. Such a very high crystal content results in an article demonstrating chemical and physical properties which are usually quite different from those exhibited by the parent glass and are more nearly characteristic of those manifested by the crystal phase itself. Furthermore, the very high crystallinity of the glass-ceramic article yields a residual glassy matrix with a far different composition from that of the parent glass inasmuch as the constituents comprising the crystal phase will have been precipitated therefrom.

Since the glass-ceramic article is derived from a glass article, the conventional methods for forming glass articles into various configurations such as blowing, casting, drawing, pressing, etc., are likewise available here. Also, because the glass body is crystallized in situ, the glass-ceramic article is free of voids and non-porous.

A more complete explanation of the theoretical concepts and the practical manufacturing considerations involved in the production of glass-ceramic articles can be had in a study of U.S. Pat. No. 2,920,971. For example, it will be readily apparent from that disclosure that the crystal phase developed in any particular glass-ceramic article will be dependent upon the composition of the parent glass article and the heat treatment to which the glass article is subjected.

The production of sintered ceramic bodies containing pollucite was known to the art but volatilization of cesia ($Cs_2O$) durinig the firing step led to inconsistent sintering behavior and poor reproductibility of product. Yet, the articles so made exhibited very high refractoriness, a relatively low coefficient of thermal expansion, and, in some instances, substantial transparency. These very desirable characteristics suggested many product applications which, in turn, resulted in considerable research effort being undertaken to overcome problems of manufacture to produce bodies demonstrating physical properties approaching those of the sintered articles consisting of pollucite alone.

Therefore, the primary objective of the present invention is the production of highly crystalline glass-ceramic articles wherein the crystal phase consists at least predominantly of pollucite.

Figure 2:
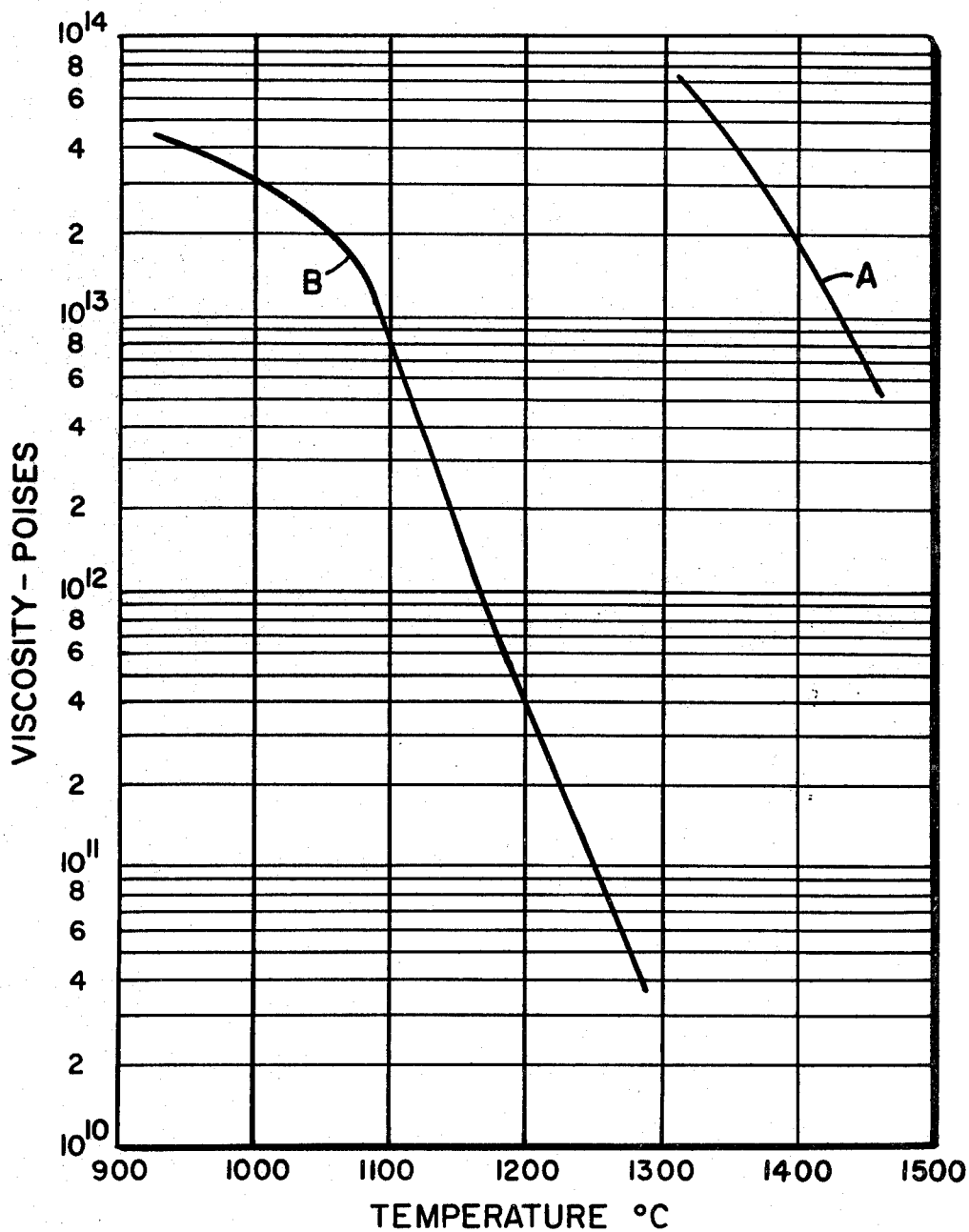

Other objects of this invention will be made apparent in the following description of the invention and in a study of the appended drawings wherein:

FIG. 1 comprises a replica electron micrograph depicting the microstructure of the products of the instant invention; and FIG. 2 sets forth a comparison between the beam bending viscosity curve demonstrated by a product of the present invention and that generated by vitreous or fused silica.

The instant invention is founded upon the discovery that glass-ceramic articles consisting essentially of pollucite solid solution crystals with, frequently, a small proportion of mullite crystals ($3Al_2O_3 \cdot 2SiO_2$) dispersed in a minor amount of residual glass can be produced through the crystallization in situ of glass articles having well-defined compositions within the $Cs_2O$-$Al_2O_3$-$SiO_2$ field. X-ray diffraction analyses of the pollucite crystals developed in the products of this invention have indicated solid solution occurring. Hence, the diffraction patterns have often approximated but not identically matched that of classical pollucite ($Cs_2O \cdot Al_2O_3 \cdot 4SiO_2$).

It is theorized that solid solution has taken place in the crystals which is similar in type to that well-recognized to occur in such crystals as beta-spodumene (classic formula $Li_2O \cdot Al_2O_3 \cdot 4SiO_2$). This, solid solutions have been defined in those crystals, for example, where the molar content of $SiO_2$ has ranged from about two to eight and minor amounts of other alkali metals have been substituted for part of the lithium and a minor proportion of the $Al_2O_3$ has been replaced with $B_2O_3$. Therefore, as employed in this specification, the expression "pollucite crystals" must be read to include solid solution.

Inasmuch as it was realized that articles exhibiting physical properties most nearly approximating those of sintered pollucite bodies would be obtained in those compositions which were equivalent to the classical stoichiometry of pollucite, those proportions of $Cs_2O$, $Al_2O_3$, and $SiO_2$ constituted the starting point for the research (in weight percent, 45% $Cs_2O$, 16% $Al_2O_3$, and 39% $SiO_2$). However, those compositions tended to surface crystallize as the molten batch was cooled to a glass body and/or during the subsequent heat treatment of the glass body such that the final product was not homogeneously crystallized. It was found that this phenomenon could be corrected where the amount of $Al_2O_3$ included was in excess of that required by the stoichiometry of pollucite.

In order to insure a substantial development of pollucite crystals in the glass-ceramic articles of this invention, more than 15% by weight of $Cs_2O$ must be present. Nevertheless, the total quantity of $Cs_2O$ ought to be held below about 40% by weight or the final product is inhomogeneously crystallized and excessively glassy. The $Al_2O_3$ content should be greater than about 10% by weight to provide basis for the crystallization of pollucite but the total amount is held below about 55% by weight. Greater amounts lead to instability in glass formation and difficulties in melting and forming. In general, the $SiO_2$ content will be greater than about 25% by weight but less than about 75% by weight. In summary, the base glass composition operable in the present invention consists essentially, by weight on the oxide basis, of:

$Cs_2O > 15\%$ but $< 40\%$
$Al_2O_3 > 10\%$ but $< 55\%$
$SiO_2 > 25\%$ but $< 75\%$ The above-recited glasses are self-nucleating, i.e., no nucleating as such is necessary to achieve the growth of relatively uniform, fine-grained crystallization. The mechanism of crystallization is considered to involve the initial development of submicroscopic nuclei of mullite upon which the pollucite solid solution crystals subsequently grow.

U.S. Pat. No. 3,236,662 discloses the production of glass-ceramic articles wherein $Cs_2O$ is optionally present in amounts up to 15% by weight as a glass stabilizer and as an inhibitor of the formation of cristobalite in the crystallized article. However, there is no suggestion therein of pullucite crystals and the principal phase developed is mullite. In contrast therewith, the articles of the present invention, containing greater amounts of $Cs_2O$, consist predominantly of pollucite crystals with, optionally, mullite.

Therefore, in broadest terms, the instant invention contemplates melting a batch for a glass having a composition falling within the $Cs_2O-Al_2O_3-SiO_2$ field delineated above, simultaneously cooling the melt at least below the transformation range thereof and shaping a glass article to a a temperature between about 1200°–1600° C. for a period of time sufficient to promote the desired crystallization in situ. (The transformation range has been defined as the temperature at which a liquid melt is deemed to have been transformed into an amorphous solid, that temperature commonly being considered as lying between the strain point and the annealing point of a glass.)

The batch ingredients employed may be any materials, e.g., oxides or other compounds, which, after being melted together, are converted to the desired oxide composition in the proper proportions. However, inasmuch as the naturally-occurring mineral, pollucite, is available commercially, its use as part of the batch materials is economically desirable since pure cesium compounds are relatively expensive.

Since the rate of crystallization is dependent upon both time and temperature, brief dwell periods only will be required where the heat treatment is conducted at the higher temperatures of the crystallization range whereas much longer periods must be utilized at temperatures within the cooler extreme of the effective range. Hence, dwell periods of only about 0.5 hour or less will be required in the hotter portion of the crystallization range to achieve fine-grained, highly crystalline articles. In contrast, at the cooler end of the crystallization range, up to 48 hours may be necessary to insure high crystallinity. Longer periods of heat treatment may generally be employed with no harm to the crystallized body. However, such longer periods are not commercially attractive since the improvement in crystallinity resulting therefrom is slight at best.

The preferred heat treatment practice comprises a two-step schedule. Thus, the glass article is first heated to a temperature somewhat over the transformation range of the glass, e.g., about 800°–1100° C., and held within that temperature field for a sufficient period of time to assure adequate nucleation and initiate incipient crystal development. Subsequently, this nucleated article is raised to a temperature between about 1200°–1600° C. and maintained within that temperature field for a sufficient period of time to promote substantial crystal growth. In general, a nucleation period of about 2–6 hours followed by a crystallization growth period of about 1–8 hours have been found to be quite satisfactory.

Inasmuch as the crystallization process is time and temperature dependent, it is readily apparent that wide variations in the means employed are feasible. Several possible embodiments are reported below.

As a first example, after the batch has been melted and the melt quenched to a temperature below the transformation range thereof and a glass article shaped therefrom, the so-formed glass article can be cooled to room temperature to permit ready visual inspection of the glass quality prior to beginning the crystallization heat treatment. Nevertheless, where speed in production and fuel economies are adjudged of paramount importance, the above melt may simply be cooled and formed into a glass article at some temperature immediately below the transformation range and then at once subjected to the crystallization treatment.

Also, whereas a two-step heat treatment procedure is much preferred, a satisfactorily crystallized body can be achieved when the initial glass article is merely heated from room temperature or just below the transformation range to temperatures within the 1200°–1600° C. range and held within that range for a sufficient length of time to develop the high crystallinity sought. Furthermore, it should be understood that no single dwell temperature as such is necessary to insure the desired fine-grained crystallization. Rather, the article can be exposed to various temperatures at will within the effective crystallization range.

In still another embodiment of the heat treating process, no dwell period at any temperature need be utilized. Hence, where the rate of heating the initial glass body above the transformation range is relatively slow and the final crystallization temperature reached is relatively high, no definite hold period as such at any specific temperature is required.

A further factor which must be considered in the crystallization process is the rate at which the original glass article is heated above the transformation range. Thus, caution should be exercised such that this rate is not so rapid that a sufficient growth of crystals to support the article will not have time to occur and the article will, consequently, deform and slump. Therefore, although heating rates of 10° C. per minute and higher can be employed, particularly where some means of physical support for the glass bodies are provided to minimize the deformation thereof, the preferred practice contemplates heating rates not exceeding about 5° C. per minute.

The above-outlined proportions $Cs_2O$, $Al_2O_3$, and $SiO_2$ have been found vital to assure the production of uniform fine-grained, highly refractory, glass-ceramic articles wherein the crystal phase consists essentially only of pollucite solid solution with, perhaps, a minor amount of mullite. Small amounts of the other alkali metal oxides may be present but the total of all such additions is preferably mainained below about 7% by weight inasmuch as their inclusion is deleterious to the refractoriness of the final product. $Li_2O$ is particularly undesirable since not only does it act as a powerful flux but its presence can lead to the development of crystals other than the desired pollucite. Therefore, it is desirably absent from the compositions with less than about 2% by weight being tolerable.

Minor amounts of $B_2O_3$ and $P_2O_5$ can be included as melting aids but, here again, the flusing action resulting from such additions is adverse to the desired high refractoriness in the crystallized products so the most preferred articles would contain less than about 5% total of these constituents. The alkaline earth metal oxides may also be added as melting and forming aids and do not seem to have such a deleterious effect upon the refractoriness of the crystallized product as do the alkali metals, $B_2O_3$, and $P_2O_5$. Nevertheless, a total of no more than about 10% by weight of these additions will be preferably tolerated.

Finally, minor amounts of such conventional nucleating agents as $TiO_2$, $SnO_2$, and $ZrO_2$ can be employed but will have little, if any, substantive utility with respect to nucleating action. $TiO_2$ and $SnO_2$, especially, behave as fluxes, thereby adversely affecting the final refractoriness of the crystallized articles. Furthermore, the presence of these agents can lead to the growth of crystal phases other than pollucite and mullite. In particular, their inclusion can lead to the formation of cristobalite which results in cracking of the body when utilized in high temperature applications. Therefore, less than about 5% total of these two components is preferred. $ZrO_2$ appears to exhibit less of these deleterious effects and seems to act more like an inert refractory filler. In view of that factor, up to 10% by weight can be employed without adversely affecting the pollucite development.

In summary, the highest refractoriness and the greatest chemical inertness to molten metal at high temperatures is achieved where the original glass composition consists essentially exclusively of $Cs_2O$, $Al_2O_3$, and $SiO_2$. However, where desired to modify such physical properties as melting and forming characteristics, coefficient of thermal expansion, mechanical strength, etc., minor amounts of the above-mentioned or other optional ingredients can be added. Such additions ought not, preferably, to exceed about 10% by weight in total. The preferred glass compositions, to insure high crystallinity with a very small amount of very refractory residual glass in the crystallized bodies, consist essentially, by weight on the oxide basis, of about 20–35% $Cs_2O$, 25–40% $Al_2O_3$, and 30–55% $SiO_2$.

Table I records compositions, expressed in weight percent on the oxide basis, of thermally crystallizable glasses which, when exposed to the heat treatment procedure outlined in this invention, were crystallized in situ to highly crystalline glass-ceramic articles. The batch ingredients for each example were dry ballmilled together for about one hour to aid in securing a homogeneous melt and subsequently melted in closed rhodium crucibles for about six hours in an electrically-fired furnace operating at about 1850°–2000° C. The resulting melts were poured onto steel plates to form patties and then immediately transferred to an annealer operating at 800° C. These patties were essentially colorless and transparent when removed from the annealer. The viscosity of the melts at the liquidi thereof varied between about 2000–50,000 poises with liquidus temperatures ranging between about 1550°–1850° C.

TABLE II

| Ex. No. | Heat treatment | Visual description | Crystal phases |
|---|---|---|---|
| 1 | 1,000° C. for 2 hours, 1,550° C. for 4 hours. | White, opaque | Pollucite and mullite. |
| 2 | 1,000° C. for 2 hours, 1,200° C. for 6 hours. | do | Do. |
| 3 | 1,100° C. for 3 hours, 1,550 °C. for 4 hours. | do | Do. |
| 4 | 1,000° C. for 2 hours, 1,450° C. for 4 hours. | do | Do. |
| 5 | 1,000° C. for 3 hours, 1,250° C. for 6 hours. | do | Pollucite and cubic $ZrO_2$. |
| 6 | 900° C. for 4 hours, 1,250° C. for 4 hours. | do | Do. |
| 7 | 1,000° C. for 4 hours, 1,550° C. for 4 hours. | do | Pollucite. |
| 8 | 1,100° C. for 2 hours, 1,550° C. for 5 hours. | do | Do. |
| 9 | 900° C. for 6 hours, 1,550° C. for 6 hours. | do | Pollucite, mullite, and cubic zirconia |
| 10 | 800° C. for 6 hours, 1,250° C. for 4 hours. | do | Pollucite and mullite. |
| 11 | 1,000° C. for 2 hours, 1,250° C. for 6 hours. | do | Pollucite, mullite, and cubic $ZrO_2$. |

The microstructure of the crystallized articles presents a highly crystalline body, i.e., greater than 50% and, commonly, greater than 80% by volume crystalline, wherein the crystals, themselves, are substantially all smaller than five microns in diameter with the majority being less than one micron in diameter. These features are illustrated through an examination of FIG. 1 which comprises a replica electron micrograph demonstrating the microstructure resulting from the heat treatment of hand drawn cane, ¼″ in diameter, of Example 3 which had merely been heated to 1600° C. at about 5° C./minute, maintained thereat for about one hour, and then removed directly from the furnace into the ambient atmosphere. In producing the micrograph, the surface of the sample was first etched for 30 seconds in a ½% aqueous solution of HF. In so doing, the pollucite was essentially removed leaving the large areas of very fine residue particles. The mullite crystals were the most resistant to the etchant solution and appear as raised portions such as are pointed out specifically by the arrows on the micrograph, in the glassy matrix. The white bar at the base of the photograph represents 1 micron in length.

The extreme refractoriness of the articles of this invention is evidenced through an examination of FIG. 2 which sets out a comparison between the high temperature viscosity curves generated by the same cane of Example

TABLE I

| Percent of | 1 | 2 | 3 | 4 | 5 | 6 | 7 | 8 | 9 | 10 | 11 |
|---|---|---|---|---|---|---|---|---|---|---|---|
| $Cs_2O$ | 15.7 | 25.1 | 25.0 | 33.4 | 25.7 | 17.1 | 35.0 | 20.0 | 17.0 | 31.1 | 16.0 |
| $Al_2O_3$ | 51.1 | 49.8 | 39.8 | 21.7 | 19.6 | 46.4 | 12.0 | 12.0 | 55.3 | 19.1 | 43.1 |
| $SiO_2$ | 28.0 | 25.1 | 35.2 | 44.9 | 46.1 | 30.5 | 51.0 | 66.0 | 21.0 | 49.8 | 34.7 |
| $K_2O$ | 5.2 | | | | 5.2 | | | 2.0 | | | 0.6 |
| $ZrO_2$ | | | | | 3.4 | 6.0 | | | 6.7 | | 5.6 |
| $B_2O_3$ | | | | | | | 2.0 | | | | |

After annealing and visual examination for glass quality, the patties were transferred to an electrically-fired furnace and subjected to the heat treatment schedules reported in Table II. In each of said schedules the temperature within the furnace was raised at a rate of about 5° C./minute to the individual dwell temperatures reported. At the conclusion of each heat treatment schedule, the electric current to the furnace was cut off and the crystallized articles simply left within to cool to room temperature. This practice, which has been termed as "cooling at furnace rate," was used, firstly, as a matter of convenience, and secondly, to insure against possible cracking or breakage from thermal shock. This rate of cooling has been estimated to average about 3°–5° C./minute.

Table II also records a visual description of the crystallized body and the crystal phases identified in the crystallized bodies through X-ray diffraction analyses, the cubic $ZrO_2$, where formed, being present in essentially trace amounts only.

3, discussed immediately above with respect to FIG. 1. and by fused silica. Curve A, reflecting the viscosity changes of Example 3, and Curve B, depicting like data for fused silica, were measured utilizing the beam bending viscosity determination procedure described in ASTM C–598, Annealing Point and Strain Point of Glass by Beam Bending. From those curves it can be observed that annealing and strain points of Example 3 are about 1416° C. and 1354° C., respectively, whereas the same points for fused silica are about 1082° C. and 953° C., respectively. Such measurements are deemed very significant since they indicate that the residual glassy matrix of Example 3 is more refractory than pure fused silica.

As another indication of the very high refractoriness exhibited by the products of the instant invention, Examples 1 and 3 have been exposed to soaking heat at 1550° C. for 24 hours with no substantial dimensional change. This extremely high refractoriness is the result not only of the presence of pollucite crystals in the articles but also of the fact that the residual glassy matrix is a highly siliceous cesium silicate. The cesium ion is very large which leads to a glass having a much higher viscosity at a particular temperature than the same glass with a like molar content of a smaller alkali metal ion such as sodium or potassium substituted for cesium. Hence, the underlying principle appears to be that the larger the alkali metal cation, the less the mobility and the greater the viscosity, i.e., at equal mole percentages and, therefore, equal non-bridging oxygens in the silicate structure. This extraordinary viscosity behavior allows the articles of the present invention to be useful at temperatures considerably higher than their annealing points.

This application is being filed concurrently with a second application of same inventors, viz, Ser. No. 212,985 which discloses the production of glass-ceramic articles wherein the primary crystal phase is mullite and the articles range from translucent to transparent in appearance, and with a third application filed in the names of L. M. Adelsberg, M. C. Carson, R. B. Forker, and H. L. Rittler, viz, Serial No. 213,223 which is directed toward the manufacture of molds for casting metals wherein the pollucite-containing materials of the instant invention can be utilized.

We claim:

1. A glass-ceramic article which consists essentially, by weight on the oxide basis, of $Cs_2O > 15\%$ but $< 40\%$, $Al_2O_3 > 10\%$ but $< 55\%$, and $SiO_2 > 25\%$ but $< 75\%$ and is composed of a multiplicity of fine-grained crystals substantially homogeneously dispersed within a glassy matrix, said crystals comprising at least 50% by volume of said article and consisting essentially of pollucite solid solution with, optionally, mullite.

2. A glass-ceramic article according to claim 1 which exhibits very high refractoriness consisting essentially, by weight on the oxide basis, of about 20–35% $Cs_2O$, 25–45% $Al_2O_3$, and 30–55% $SiO_2$.

References Cited

UNITED STATES PATENTS

| | | | |
|---|---|---|---|
| 3,236,662 | 2/1966 | MacDowell | 106—52 X |
| 3,422,025 | 1/1969 | Snitler et al. | 106—52 |
| 3,640,890 | 2/1972 | Lee | 106—52 |
| 3,282,770 | 11/1966 | Stookey et al. | 106—39 D V |
| 3,232,771 | 2/1966 | Pearce | 106—38.35 |

HELEN M. McCARTHY, Primary Examiner

U.S. Cl. X.R.

106—52; 65—33